Dec. 25, 1951     A. R. COVIELLO     2,579,651
V-TYPE DITCHER
Filed April 29, 1947     2 SHEETS—SHEET 1
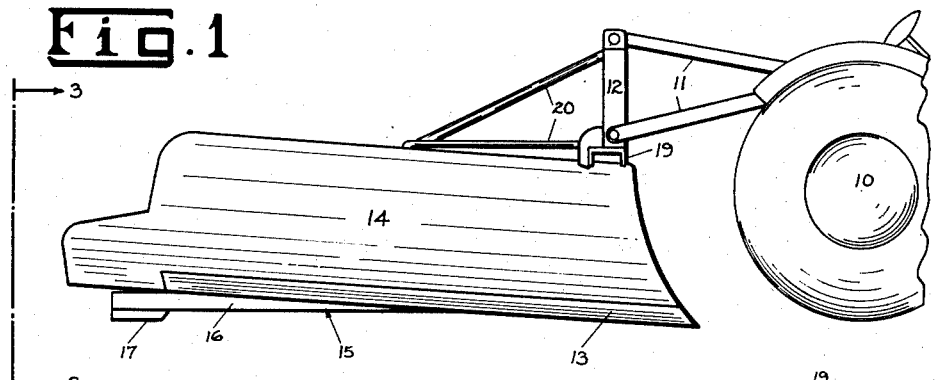
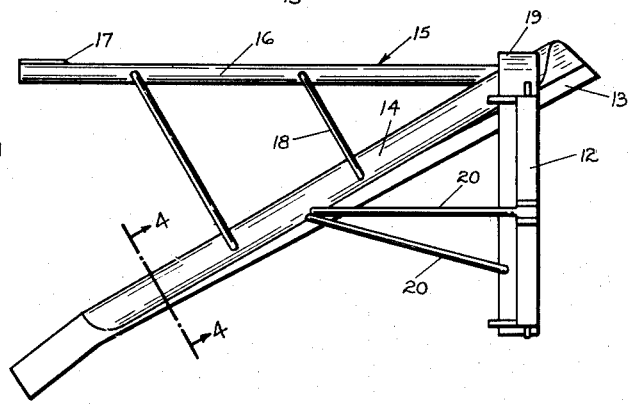
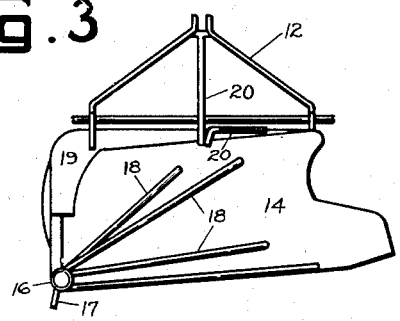
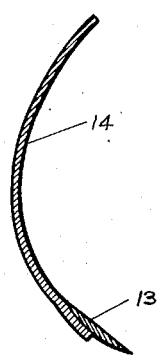
*INVENTOR.*
ANTHONY R. COVIELLO
BY
ATTORNEYS Dec. 25, 1951  A. R. COVIELLO  2,579,651
V-TYPE DITCHER Filed April 29, 1947  2 SHEETS—SHEET 2

*INVENTOR:-*
ANTHONY R. COVIELLO
BY

ATTORNEYS

Patented Dec. 25, 1951

2,579,651

UNITED STATES PATENT OFFICE 2,579,651

V-TYPE DITCHER

Anthony R. Coviello, Tulare, Calif.

Application April 29, 1947, Serial No. 744,648

2 Claims. (Cl. 37—98)

The present invention relates to agricultural implements and more particularly to ditchers of the V type. V type ditchers have been popularly employed in the scraping of earth laterally with reference to the direction of movement of the ditcher in the creation of dikes, irrigating ditches, and the like. Ditchers of this type generally exercise a wedging action on earth encountered to discharge it laterally. Such ditchers are characterized by a tendency to yaw. This is particularly true in ditchers in which it is desired to discharge the encountered earth unilaterally. The yawing effect and the generally unsatisfactory tractability of such devices have precluded their being mounted fixedly on draft appliances and thus have not been subject to the advantages incident to such mounting. As is well known in other agricultural implements the engaging of an earth working tool to an elevationally positionable tool bar of a draft appliance results in more efficient application of the power of the draft appliance, more expeditious employment of the earth working tool, and a control generally not obtainable in earth working tools not so fixedly attached.

An object of the present invention is to provide an improved ditcher of the V type.

Another object is to achieve in V ditchers the advantages normally incident to the mounting of earth working tools fixedly on elevationally positionable tool bars of draft appliances.

Another object is to provide a ditcher of the V type resisting the tendency to yaw heretofore characteristic of such ditchers.

Another object is to provide a ditcher effecting a unilateral discharge of earth encountered thereby and characterized by accuracy of control.

Another object is to provide a ditcher of the type set forth in the preceding paragraph that is tractable in nature.

Another object is to provide a ditcher of the V type that is adapted to be elevationally positioned by being fixedly attached to a tool bar of a carry-all or draft appliance that is elevationally controlled.

Another object is to provide such a ditcher that is adjustably positionable in laterally tipped attitudes about a longitudinal axis.

In accomplishing these and other objects of the present invention I have provided improved details of structures which are illustrated on the accompanying drawings wherein:

Fig. 1 is a side elevation of a form of the ditcher of the present invention fragmentarily illustrating a draft appliance to which it is attached and by which it is caused to traverse terrain to be ditched.

Fig. 2 is a plan view of the ditcher seen in Fig. 1, disassociated from the draft appliance.

Fig. 3 is a rear view of the draft appliance as seen from line 3—3 in Fig. 1.

Fig. 4 is a fragmentary sectional view of the ditcher as taken on line 4—4 of Fig. 2.

Figure 5:
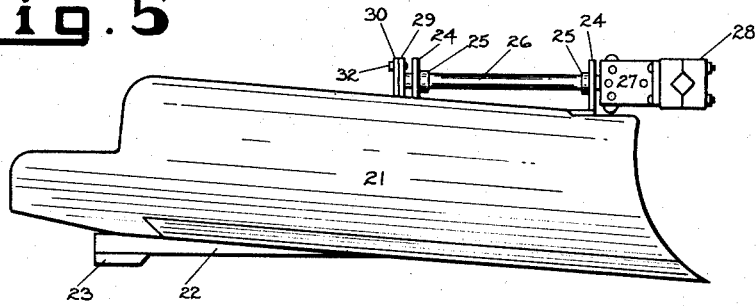
Fig. 5 is a side elevation of a second form of the present invention.

Referring in greater detail to the drawings:

In Fig. 1 a draft appliance, such as a tractor 10, is fragmentarily illustrated. Drawing and elevating arms 11 are characteristic of drawing and elevating means conventionally provided in such tractors. The arms are rearwardly extended from the tractor and usually raised and lowered by hydraulic or mechanical means. A conventional A frame, indicated generally at 12, is attached to the rearwardly disposed end portions of the arms and is raised and lowered thereby. The tractor, the arms, and the A frame are conventional elements and do not comprise elements of the present invention, being merely illustrative of elevationally controlled traction means of a draft appliance. It is to be understood that the present invention is in no way limited thereto.

The ditcher of the present invention provides a scraper blade 13 angularly related to the normal direction of movement of the ditcher and has forwardly and rearwardly disposed end portions. The angular relation of the scraper blade to the normal direction of movement of the ditcher is clearly apparent in Fig. 2. The scraper blade is supported by a moldboard 14 which mounts the scraper blade and extends upwardly therefrom, arcuately as shown in Fig. 4. The downwardly disposed edge portion of the moldboard is rearwardly offset to receive the scraper blade so that said scraper blade and moldboard present a substantially smooth surface to earth encountered thereby. It has been found convenient to employ a double edged scraper blade, as shown in Fig. 4, which may be reversed when one of the edges thereof becomes worn. The scraper blade and moldboard comprise a scraper member adapted laterally to discharge earth encountered thereby.

As seen in Fig. 1, the forward end portion of the moldboard and scraper blade are preferably lower than the rearwardly disposed end portions thereof. This is in response to the usual desire to form a ditch having a deep center portion and shallow edge portions.

A guide member 15 is fixedly connected to the forward end portion of the moldboard and rearwardly extending therefrom in substantial alignment with the normal direction of movement of the ditcher. The guide member conveniently comprises a boom 16 affixed to the moldboard 14, as by welding, and aligned with the normal direction of movement, as described. The boom at its rearwardly disposed end portion has a fin 17 mounted thereon and extending therefrom downwardly and to the side thereof opposite the moldboard. To the end of securing the guide member and the scraper member in rigid angular relationship struts 18 are interconnected with the boom 16 and the moldboard 14.

To provide convenient connecting of the A frame 12 with the scraper member and the guide member, a bracket member 19 is secured to the boom 16, as by welding, extended upwardly therefrom, and laterally across the scraper member. The attitude in which the bracket member is secured is largely dependent upon the angular relationship or laterally tipped attitude desired for the scraper member, it being apparent that the laterally extended portion of the bracket member is preferably horizontal. The bracket member and the A frame are fixedly secured, as shown in Fig. 3. Further rigidity to the structure is imparted by braces 20 interconnected the moldboard 14 and the A frame, and the moldboard and the bracket 19.

The operation of the ditcher of the present invention is obvious from the preceding description and is briefly summarized at this point. The ditcher is caused to traverse an area to be worked, by a draft appliance 10. The raising and lowering of the rearwardly disposed end portions of the arms 11 and the A frame 12, serve to elevate and to depress the ditcher, providing accurate control of the depth of ground engagement of the ditcher and of ground clearance thereof for transporting purposes.

Soil encountered by the scraper blade 13 is raised thereby and edged laterally by the moldboard 14, being deposited by the rearward end portion thereof. It is clearly apparent that the encountered earth exercises a rearwardly directed force on the scraper blade and moldboard tending to rotate the angularly related scraper member and guide member so as to align the scraper blade and moldboard with the direction of movement of the ditcher. This tendency has heretofore been largely responsible for the yawing effect so objectionable in such implements. In the present invention this effect is overcome by the fin 17 which is borne by the boom 16. The downwardly and laterally extending attitude of the fin, as seen in Fig. 3, serves to oppose the rearward forces imposed on the moldboard and scraper blade. The greater the rearwardly directed forces on said scraper member the deeper the fin is extended into the earth and thereby the greater is the fin's ability to resist said forces. Thus the fin keeps the boom substantially aligned with the movement of the ditcher and the desired tractability is achieved.

*Second form*

Figure 6:
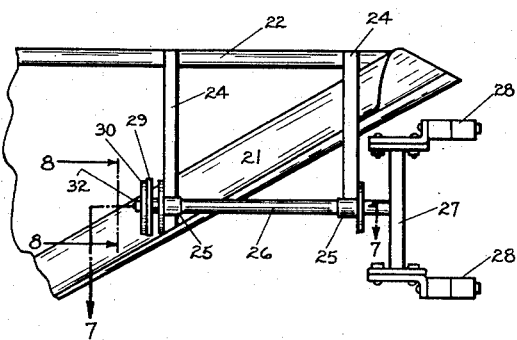
Fig. 6 is a plan view of the ditcher of the present invention seen in Fig. 5.
Figure 7:
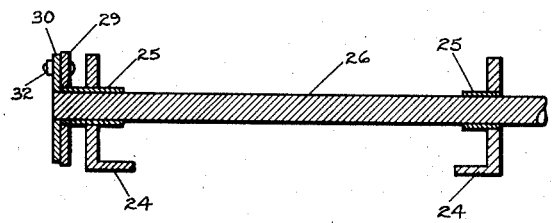
Fig. 7 is a sectional view taken on line 7—7 of Fig. 6.
Figure 8:
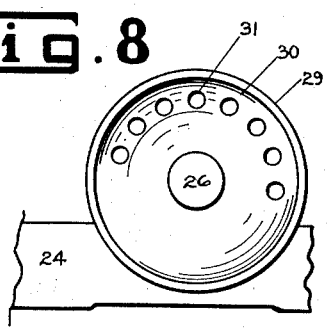
Fig. 8 is a fragmentary elevation of an adjustment means of the present invention as seen from line 8—8 of Fig. 6.

A second form of the present invention is illustrated in Figs. 5, 6 and 7, in which a scraper member 21 and a guide member 22, similar to those heretofore described, are employed. The tractability desired in ditchers is achieved in the second form by a fin 23 of the guide member in the manner already described and thus is not at this point again described.

The second form differs from the first in that it provides lateral tilting of the ditcher and thus the adjusting of the lateral attitude assumed thereby. This adjustability assists in regulating the depth of soil engagement, the slope of the bottom of the ditch being formed, and the lateral distribution of encountered earth. Adjustment of this lateral tilt is achieved by providing a pair of brackets 24 interconnecting the scraper member 21 and the guide member 22 and extending laterally across the top of the ditcher. Bearings 25 are mounted on the brackets in substantial alignment with the normal direction of movement of the ditcher and preferably transversely centered on the ditcher. A shaft 26 is journaled in the bearings and provides at its forward disposed end portion a cross arm 27 and clamps 28 borne by the crossarm, adapted to embrace a tool bar of a draft appliance. A circular plate 29 is coaxially positioned relative the shaft and is secured rearwardly disposed on the rearward bearing. A similar circular plate 30 is secured to the shaft coaxially thereof and adjacent the plate 29. Said plates are preferably provided with juxtaposed openings 31 therein near their peripheries. The plate 30 being secured to the shaft 26 and plate 29 being secured to a bearing 25, it is obvious that they may be rotationably positioned relative to each other. A pin means, or bolt, 32 is preferably provided for insertion through juxtaposed openings to lock the plates in selected relationship. Such locking serves to secure the ditcher in adjusted laterally tipped attitude relative the draft appliance by which ground traversing movement is imparted thereto.

The ditchers of the present invention successfully resist the tendency to yaw commonly experienced in ditchers of the V type. A unilateral discharge of encountered earth is achieved in ditchers that are conveniently tractable. Having a high degree of tractability, the ditchers are successfully mounted in fixed relation on draft appliances. The second form provides accurate adjustment of the lateral tipping of the ditcher and the dependable securing of the same in adjusted attitude. The ditchers are simple in structure, dependable in operation, and economical to produce.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices.

Having described my invention what I claim as new and desire to secure by Letters Patent is:

1. In ditchers of the type described, a shaft journaled therein substantially aligned with the normal direction of movement of said ditcher, clamps borne by the forward end portion of the shaft adapted to embrace a draft appliance, a pair of circular plates having juxtaposed openings formed therein near their peripheries positioned coaxially on the shaft in fore and aft adjacent relation, the forward thereof being affixed to the ditcher and the rearward thereof affixed to the shaft, and a pin member receivable by the juxtaposed openings of the plates to secure the plates in adjusted rotational position.

2. An agricultural implement comprising an elongated shaft mounted in substantially horizontal position for endward earth traversing movement, an earth working tool rotatably mounted on the shaft in predetermined attitude relative to the longitudinal axis of the shaft, a pair of circular plates having juxtaposed openings formed therein near their peripheries positioned coaxially on the shaft in fore and aft adjacent relation, one thereof being affixed to the earth working tool and the other thereof affixed to the shaft, and a pin member receivable between juxtaposed openings of the plates to secure the plates in adjusted rotational position.

ANTHONY R. COVIELLO.

REFERENCES CITED

The following references are of record in the file of this patent:

UNITED STATES PATENTS

| Number | Name | Date |
|---|---|---|
| 975,544 | Lindsey | Nov. 15, 1910 |
| 1,227,508 | Vidrine | May 22, 1917 |
| 2,437,059 | Williams | Mar. 2, 1948 |

FOREIGN PATENTS

| Number | Country | Date |
|---|---|---|
| 632,686 | Germany | July 11, 1936 |